July 31, 1928.

J. L. WILSON ET AL 1,679,236

PIPE PATCH

Filed Aug. 24, 1927

James L. Wilson,
T. Garrard Vicars,
INVENTORS

BY Victor J. Evans
ATTORNEY

P. T. Hickey
WITNESS:

Patented July 31, 1928.

1,679,236

UNITED STATES PATENT OFFICE.

JAMES L. WILSON AND THOMAS GARRARD VICARS, OF PINEVILLE, KENTUCKY.

PIPE PATCH.

Application filed August 24, 1927. Serial No. 215,198.

The present invention relates to pipe patches and particularly to the means for securing a patch on a pipe which has sprung a leak. The device is particularly useful where a leak must be quickly repaired and is of great value in emergency cases.

Objects of the invention are to provide a device which may be quickly and effectively used in stopping a leak in a pipe and which may be simply and expeditiously mounted thereon. Other objects are simplicity and cheapness of construction.

Figure 1:
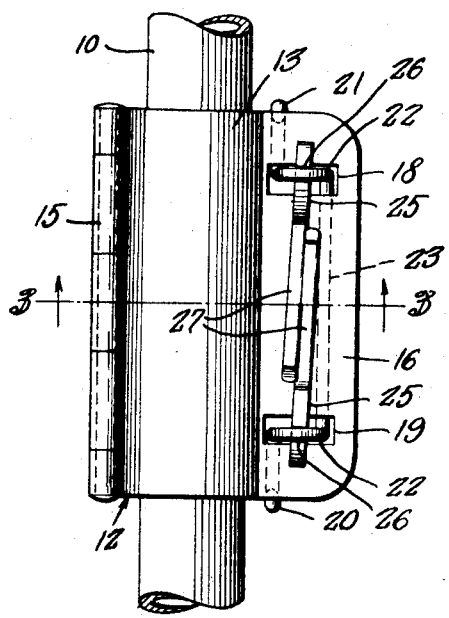
Figure 1 is a side elevation of the device placed on a pipe.
Figure 2:
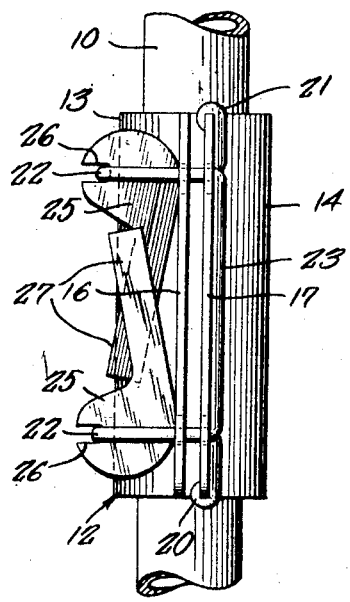
Figure 2 is a view of the device at right angles to that shown in Figure 1.
Figure 3:
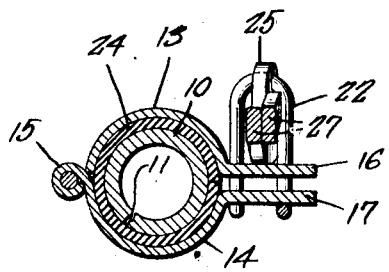
Figure 3 is a section on the line 3—3 of Figure 1, showing the relation of the parts to the pipe when clamped in place.
Figure 4:
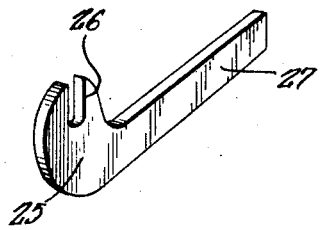
Figure 4 is a detail view of one of the clamping cams.

Referring to the drawings in detail, 10 designates a pipe in which presumably there has sprung a leak, as shown at 11 in Figure 3. 12 designates the clamp forming the subject matter of my invention. The clamp consists of two semi-cylindrical members 13 and 14 hinged together at 15 and having radial flanges 16 and 17 extending therefrom at points opposite the hinge. The flanges are provided with elongated apertures 18 and 19 which lie so that the apertures in one of the flanges will be opposite those in the other. The semi-cylindrical members 13 and 14 are locked on the pipe by means of wire members secured to one of said flanges in any suitable manner, as by being bent over thereupon as at 20 and 21. The wire is then passed through the elongated apertures and formed into loops 22 extending at right angles to the flange to which it is secured, the intermediate portion 23 of the wire between the loops passing on the under side of the flange to which the loops are secured. When it is desired to clamp the sleeve formed by members 13 and 14 on a pipe, the semi-cylindrical members are placed upon the pipe in position over the aperture to be sealed, a strip of rubber, leather or other suitable material 24 having been first placed over the said aperture. The loops 22 are then projected through the apertures of the plate 16 and suitable cams 25 having kerfs 26 adapted to receive the wire loop therein placed in position, said cams having extended arms 27 providing handles by which they may be moved to clamping or unclamping position.

From the above description it will appear that we have produced an effective device by which a sudden leak in a pipe may be quickly and effectively patched. Such a device may be kept about a household and when such leaks occur may be placed thereon until a plumber can be summoned to repair the damage.

Having described the invention we claim:

1. In a device of the character described, a pair of semi-cylindrical members hinged together at one edge, radial flanges extending from the opposite edges, loops extending from one of said flanges and adapted to be received in apertures in the other flange adapted to receive said loops projecting therethrough, and cam members on said loops adapted to draw the flanges together.

2. In a device of the character described, a pair of semi-cylindrical members hingedly secured together at one edge, radial flanges extending from the opposite edges and being provided with elongated apertures, a wire member secured to one of said flanges, loops formed with said wire member and adapted to be passed through the apertures, and cam members having slots therein to receive said loops and being adapted to draw the flanges together.

In testimony whereof we affix our signatures.

JAMES L. WILSON.
T. GARRARD VICARS.